Feb. 27, 1934.  E. DE LUCA  1,949,145
SYNCHRONOUS DRIVING DEVICE
Filed Dec. 24, 1932

Inventor:-
Ettore De Luca,
By:- Smith, Michael and Gardiner,
Attorneys.

Patented Feb. 27, 1934

1,949,145

UNITED STATES PATENT OFFICE 1,949,145

SYNCHRONOUS DRIVING DEVICE

Ettore De Luca, London, England, assignor to John Hogg Robertson, London, England Application December 24, 1932, Serial No. 648,776
In Great Britain November 9, 1932

6 Claims. (Cl. 172—239)

This invention relates to devices for driving two or more apparatus in synchronism, particularly for the recording or reproduction of sound in association with moving pictures.

In synchronous driving devices for this purpose, it is already known to drive one of the apparatus by means of an electric motor controlled in its rotation by a current distributor operated in conjunction with another apparatus to be synchronized with the first, the electric motor comprising a closed stator winding divided into sections with the junction points of the sections connected to the stationary contacts of the distributor and fed with current through rotary contact brushes; with devices of this kind, the two apparatus to be associated have usually to be started at the same time, since the motor is incapable of developing sufficient force to accelerate its driven apparatus up to the synchronous speed.

The improved synchronous driving device, according to my invention, comprises an electric motor adapted to drive or to control one of the associated apparatus, the motor being controlled in its rotation by a current distributor driven by another apparatus associated with the first, and operating either synchronously as an induction motor (for starting) or synchronously (for normal running) at will, so that it can start and bring itself into synchronism with the other associated apparatus, even when the latter is or are already in motion.

The current-distributor, which acts in the manner of a commutator for the motor windings, comprises brushes connected to a suitable source of current and revolving in relation to a plurality of contacts which are connected to the junction points of an equal number of coils connected in series with one another as a closed winding mounted upon a magnetic core which forms the stator of the motor. When the distributor is in motion, the magnetic field produced by the closed stator winding will be transformed into a revolving magnetic field in the known manner, being fed with alternating current at a frequency equal to the number of revolutions per second of the distributor: the number of phases of this alternating current will correspond with the number of coils in the closed stator winding.

In the revolving magnetic field of the stator thus obtained, there is placed a rotor formed by a magnetic core provided with a similar divided winding but having a number of poles preferably different from the stator; the rotor winding is controlled by a switch, through which it can be connected in short circuit or fed with current, preferably at two diametrically opposite points. If the rotor winding is short-circuited, while the stator winding is fed with current through the revolving distributor, the rotor will commence to revolve without actually reaching the number of revolutions corresponding to the frequency of the revolving stator field, that is to say that the machine will behave like an induction motor having a short-circuited rotor.

The distributor is preferably fitted with at least two positive brushes and two negative brushes in order always to ensure a circuit with the contacts; if single brushes were used, it would result in the formation of sparks and a back E. M. F. at passing from one contact to the next, thus opposing or preventing the action stated above, so that the motor would be incapable of giving satisfactory power and output.

My invention further comprises an arrangement in which the brushes of the distributor are set in pairs spaced circumferentially at different angles apart in the two pairs, whereby the number of phases of the distributed alternating current becomes a multiple of the number of contacts in the distributor, although the number of connecting cables distributing these phases remains the same as the number of contacts, which gives the practical advantage of providing a multiple effect with relatively few conductors.

The invention is hereafter described in a preferred embodiment consisting of a servomotor having its stator winding divided into twelve coils and connected by twelve conductors to a distributor having twelve stationary contacts with two pairs of revolving brushes, although it will be understood that the number of poles, conductors and contacts may be varied according to the particular application.

Referring to the accompanying drawing,—

Figure 1:
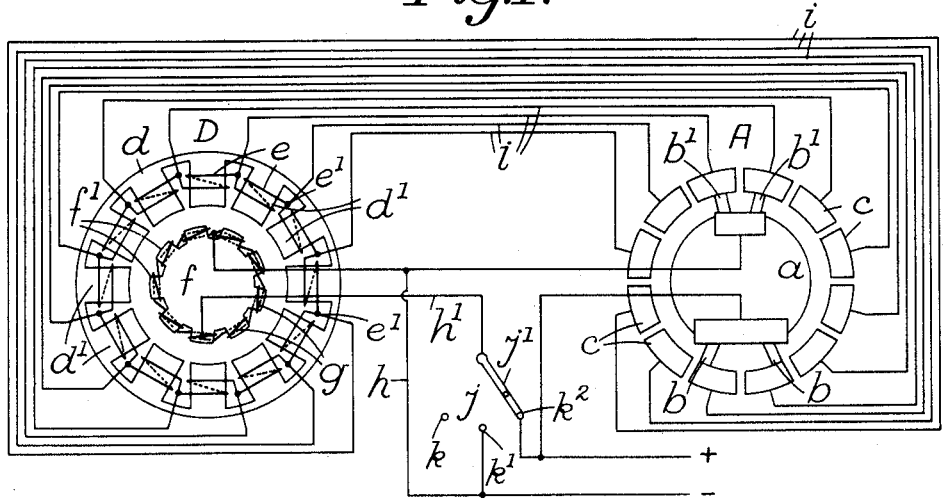
Figure 1 represents the servomotor, distributor and control switch, all the parts being shown diagrammatically.

In Figure 1, the distributor A comprises a rotor or brush holder $a$, which is driven in conjunction with one of the apparatus (not shown) and is provided with two pairs of brushes $b$, $b$, $b^1$, $b^1$, connected to the respective current supply poles, the two brushes of each pair being spaced apart circumferentially at suitable angles as hereafter described; these rotating brushes connect with the various stationary contacts $c$ of the distributor to establish circuits in connecting cables $i$ leading to the stator $d$ of the motor D, which has an equal number of coils $e$ (twelve coils, in the case illustrated) mounted on its poles $d^1$ and connected in series with one another to form a closed ring winding. The cables $i$ connect with the junction points $e^1$ of the several coils $e$ forming the sectional stator winding.

Assuming that the brushes $b$, $b^1$ of the distributor A are caused to revolve at any given speed, either constant or variable, due to the starting of the sound-recording or other apparatus by which the distributor is driven, they will supply current to the various contacts or segments $c$ in turn as these latter are brought into circuit by the rotation of the distributor, and since these contacts $c$ are connected with the respective junction points $e^1$ of the coils $e$ on the stator, there will be produced in the motor D a revolving magnetic field having a frequency equal to the speed of rotation of the distribtuor A.

In the revolving field thus obtained, there is mounted a rotor $f$ formed by a magnetic core provided with a winding likewise comprising coils $g$ mounted upon its poles $f^1$, the number of which is different from the stator; the coils $g$ are connected in series to form a closed ring, two opposite points of which are connected by leads $h$ $h^1$ respectively to the negative supply pole and to the arm of a switch $j$ having three positions.

When the switch $j$ has its arm $j^1$ upon the stud $k$, the circuit of the rotor winding or coils $g$ will be open; the rotor $f$ will remain stationary, because the induced E. M. F. set up in its winding will have no reaction upon the magnetic field, so long as the rotor circuit remains open.

When the switch arm $j^1$ passes on to the contact stud $k^1$, the circuit of the rotor winding $g$ is closed in short circuit, and the current due to the induced E. M. F. will produce a magnetic field on the rotor $f$, which will seek to follow the revolving magnetic field of the stator, but always with a certain slip as in an ordinary asynchronous or induction motor.

The rotor winding $g$ will be the seat of induced currents opposite to those of the stator winding $e$ which produces the revolving field, and the motor will operate as a true transformer; the rotor $f$ will seek to follow the revolving field, the induction current produced in the rotor having a periodicity corresponding to the difference between the number of revolutions of the magnetic field and its own. If the rotor winding, forming the secondary circuit of this transformer, be now opened by means of the switch $j$ previously closed, the magnetic poles of the revolving field will have no reaction, and consequently the motor will cease to run.

When this motor has been started and has reached a certain speed, if the rotor circuit be opened again and fed with current at two diametrically opposite points, by moving the switch arm $j^1$ from the contact stud $k^1$ to the contact $k^2$, there will be obtained on the one side of the rotor a series of coils energized to produce north poles and on the other side a series of coils producing south poles; the motor will therefore continue to revolve and will attain the same number of revolutions as the revolving magnetic field, that is to say the rotor will run at the same frequency as the revolving field and it will have become synchronized with the distributor, thereby bringing the associated apparatus into synchronism.

The rotor $f$ will have its poles defined by the E. M. F. applied by the source so that the rotor will revolve in synchronism with the rotating field, without any slip, and the motor will therefore operate as a synchronous motor, running in exact synchronism with the distributor $a$. Thus the apparatus driven by the motor D will become synchronized with the sound-recording or other apparatus which drives the distributor A.

Figure 1 also represents the preferred arrangement of the two pairs of brushes upon the distributor A; the first pair $b^1$, shown connected to the negative supply pole, are spaced apart to cover the exact length of one contact segment $c$, and the second pair $b$, shown connected to the positive supply pole, are spaced at a distance approximately double, so as to cover the length of two adjacent contacts or segments $c$, the two pairs of brushes being spaced symmetrically at opposite ends of a diameter of the distributor or commutator. This arrangement of the brushes, apart from ensuring certainty of electrical contact and preventing the formation of sparks, as described above, gives a further advantage in that the current distributed to the motor D possesses not twelve pulsations in one revlution of the distributor A but four times as many, that is forty-eight pulsations, so that the twelve contacts $c$, twelve connecting cables $i$ and twelve stator coils $e$ provide the same effect as forty-eight contacts, cables and coils; this effect can be obtained with any other number of contacts, cables and coils, if desired. In the particular example illustrated, the twelve contacts or segments $c$ are 27½ degrees long, with a gap of 2½ degrees between adjacent contacts $c$; the brushes, which are 5 degrees wide, are set at 11¼ degrees in front of and behind the neutral line in the case of the upper brushes $b^1$, with a gap of 17½ degrees between them, and 26¼ degrees in front of and behind the neutral line in the case of the lower brushes $b$, leaving a gap of 47½ degrees between them.

Figure 2:
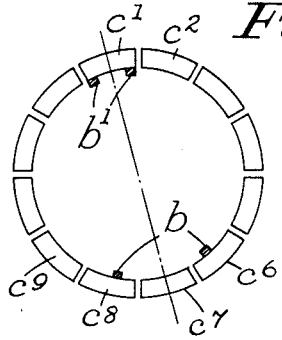
Figures 2, 3, 4 and 5 are other diagrams referred to hereafter.

In the position represented in Figure 2, the first pair of brushes $b^1$ are upon the contact $c^1$ and the other pair $b$ upon the two contacts $c^6$ and $c^8$, while the intermediate contact $c^7$ is out of circuit, which is equivalent to the brushes $b$ resting upon the contacts $c^6$, $c^7$ and $c^8$. Current is therefore distributed to ten of the twelve stator coils $e$, in two parallel sets of five coils in series; the coils connected between the contacts $c^6$ $c^7$ and $c^7$ $c^8$ are short-circuited.

Figure 3:
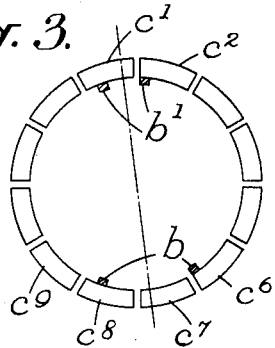

The next diagram, Figure 3, represents the same distributor A, with the brushes rotated through 7½ degrees; consequently, the brushes engage the contacts $c^1$ $c^2$ and $c^6$ $c^8$ respectively, and another of the stator coils (viz that connected between the contacts $c^1$ $c^2$) will be short circuited by the brushes $b^1$. This will produce a rotary displacement of the magnetic field in the motor D and the rotor $f$ will be displaced likewise by 7½ degrees.

Figure 4:
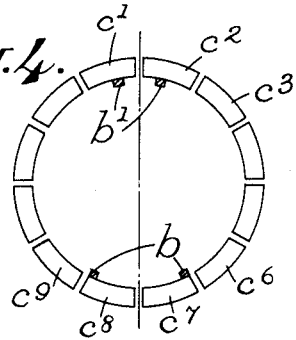

In the third position, Figure 4, the brushes engage the contacts $c^1$ $c^2$ and $c^7$ $c^8$ respectively, so that the coil connected between the contacts $c^6$ $c^7$ comes into operation and again ten stator coils are fed with current; consequently the magnetic field will be displaced by a further 7½ degrees, with a corresponding movement of the rotor $f$ of the motor D.

Figure 5:
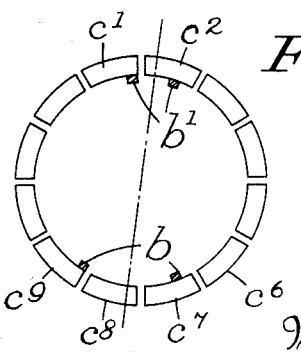

In the fourth position, Figure 5, the brushes will engage the contacts $c^1$ $c^2$ and $c^7$ $c^9$, which means a further displacement of the magnetic field and of the rotor by 7½ degrees, due to the short-circuiting of the stator coil connected between the contacts $c^8$ $c^9$.

Consequently, due to this provision of two pairs of brushes with the brushes of each pair set at different angles apart, the motor which with twelve contacts and twelve wires would give twelve displacements of 30°, now gives forty-eight displacements of one-fourth of that angle, that is to say 7½ degrees, so that the displacement of the magnetic field approximates better to a uniformly revolving field (as in a three-phase motor) and the effect is substantially the same as could be obtained with a motor having forty-eight poles controlled by a distributor having two brushes and forty-eight contacts, feeding forty-eight stator coils through forty-eight connections such as $i$, but the complications involved by that large number of contacts, coils and connections are obviated while still obtaining a very uniform driving torque of the motor and rigorous synchronization of the associated apparatus.

What I claim is:—

1. A synchronous driving device, comprising an electric motor having a wound rotor and a wound stator, said rotor being coupled to a driven apparatus, a distributor coupled to an apparatus with which said driven apparatus is to be synchronized, said distributor including a plurality of contacts and pairs of brushes revolving in relation to said contacts, said pairs of brushes being spaced circumferentially at unequal angles, means for feeding current through said pairs of brushes and distributor contacts to the stator windings of said motor, and means for first short-circuiting and then feeding current to the rotor windings of said motor.

2. A synchronous driving device, comprising an electric motor having a wound rotor and a wound stator, said rotor being coupled to a driven apparatus, a distributor coupled to an apparatus with which said driven apparatus is to be synchronized, said distributor including a plurality of contacts and pairs of brushes revolving in relation to said contacts, one pair of brushes being spaced circumferentially to cover the length of one distributor contact, the other pair of brushes being spaced circumferentially to cover the length of two adjacent distributor contacts, means for feeding current through said pairs of brushes and distributor contacts to the stator windings of said motor, and means for first short-circuiting and then feeding current to the rotor windings of said motor.

3. A synchronous driving device, comprising an electric motor having a wound rotor and a multipole wound stator, said rotor being coupled to a driven apparatus, a distributor coupled to an apparatus with which said driven apparatus is to be synchronized, said distributor having a number of contacts equal to the number of poles of said stator and pairs of brushes revolving in relation to said contacts, said pairs of brushes being spaced circumferentially at unequal angles, means for feeding current through said pairs of brushes and distributor contacts to the stator windings of said motor, and means for first short-circuiting and then feeding current to the rotor windings of said motor.

4. A synchronous driving device, comprising an electric motor having a wound rotor coupled to a driven apparatus and a wound stator with a greater number of poles than said rotor, a distributor in the form of a commutator having a number of segments equal to the number of stator poles with pairs of brushes making contact with said segments, said pairs of brushes being spaced circumferentially at unequal angles at opposite ends of a diameter of said commutator, a carrier for said pairs of brushes, said carrier being coupled to an apparatus with which said driven apparatus is to be synchronized, means for feeding current through said pairs of brushes and commutator segments to the windings of said stator, and switching means for the windings of said rotor, said switching means providing for the short-circuiting of said rotor windings for starting purposes and also for the feeding of said rotor windings to produce defined poles for synchronous operation.

5. A synchronous driving device, comprising an electric motor having a wound rotor and a wound stator, said rotor being coupled to a driven apparatus, a distributor coupled to an apparatus with which said driven apparatus is to be synchronized, said distributor including a plurality of contacts and pairs of brushes revolving in relation to said contacts, one pair of brushes being spaced circumferentially to cover the length of one distributor contact, the other pair of brushes being spaced circumferentially to cover the length of two adjacent distributor contacts, means for feeding current through said pairs of brushes and distributor contacts to the stator windings of said motor, and means for feeding current to the rotor windings of said motor.

6. A synchronous driving device, comprising an electric motor having a wound rotor and a multipole wound stator, said rotor being coupled to a driven apparatus, a distributor coupled to an apparatus with which said driven apparatus is to be synchronized, said distributor having a number of contacts equal to the number of poles of said stator and pairs of brushes revolving in relation to said contacts, said pairs of brushes being spaced circumferentially at unequal angles, means for feeding current through said pairs of brushes and distributor contacts to the stator windings of said motor, and means for feeding current to the rotor windings of said motor.

ETTORE DE LUCA.